United States Patent [19]

Maeda et al.

[11] Patent Number: 5,764,607
[45] Date of Patent: Jun. 9, 1998

[54] METHOD AND APPARATUS FOR CONTROLLING DIGITAL COPYING OF DIGITALLY RECORDED INFORMATION

[75] Inventors: Shigemi Maeda, Yamato-Koriyama; Kunio Kojima, Nabari; Jun Akiyama, Kashihara, all of Japan

[73] Assignee: Sharp Kabushiki Kaisha, Osaka, Japan

[21] Appl. No.: 731,125

[22] Filed: Oct. 9, 1996

Related U.S. Application Data

[63] Continuation of Ser. No. 305,687, Sep. 13, 1994, abandoned.

[30] Foreign Application Priority Data

Oct. 27, 1993 [JP] Japan .................... 5-268605

[51] Int. Cl.$^6$ .................................................. G11B 7/00
[52] U.S. Cl. .............................. 369/47; 369/54; 369/84
[58] Field of Search ........................... 369/47–48, 50, 369/54, 58, 84, 111, 124; 360/15

[56] References Cited

U.S. PATENT DOCUMENTS

| | | | |
|---|---|---|---|
| 4,325,089 | 4/1982 | Hsu | 360/15 |
| 4,937,679 | 6/1990 | Ryan | 360/15 X |
| 4,975,898 | 12/1990 | Yoshida | 369/48 X |
| 5,177,619 | 1/1993 | Sato | 360/15 X |
| 5,295,126 | 3/1994 | Okano et al. | 369/84 X |
| 5,311,492 | 5/1994 | Tabuchi et al. | 360/15 X |
| 5,317,549 | 5/1994 | Maeda et al. | 369/58 X |
| 5,428,598 | 6/1995 | Veldhuis et al. | 369/84 X |

FOREIGN PATENT DOCUMENTS

| | | |
|---|---|---|
| 0 010 716 A1 | 5/1980 | European Pat. Off. . |
| 0 234 709 A2 | 9/1987 | European Pat. Off. . |
| 4-258834 | 9/1992 | Japan . |

OTHER PUBLICATIONS

Shibazaki et al, "Merit and Demerit of DAT", Radio and Experiment, Sep. 1990, pp. 106–115, published in Tokyo, Japan.

*Primary Examiner*—W. R. Young
*Attorney, Agent, or Firm*—Nixon & Vanderhye

[57] ABSTRACT

An information recording and reproduction apparatus uses a recording medium that contains information which prohibits digital copying. A reproduction section reproduces the desired informatiion stored on a first recording medium. A recording section records the reproduced output at a desired position on a second recording medium. However, an erasing section erases the information from the first recording medium during the process of recording that information on the second recording medium. The first and/or second recording medium cannot be removed from the information recording and reproduction apparatus until the erasing operation is completed.

16 Claims, 8 Drawing Sheets

METHOD AND APPARATUS FOR CONTROLLING DIGITAL COPYING OF DIGITALLY RECORDED INFORMATION

This is a continuation of application Ser. No. 08/305,687, filed Sep. 13, 1994, now abandoned.

BACKGROUND OF THE INVENTION

The present invention relates to recording digitized signals, and more particularly, to an information recording and reproduction apparatus using a recordable compact disk.

Compact disks (hereafter referred to as CDs) on which information, such as music information, is recorded as digital signals using optically detectable bits are now in wide conventional use. To date, optical disk reproduction apparatus (CD players) are used exclusively for reproduction.

Figure 8:
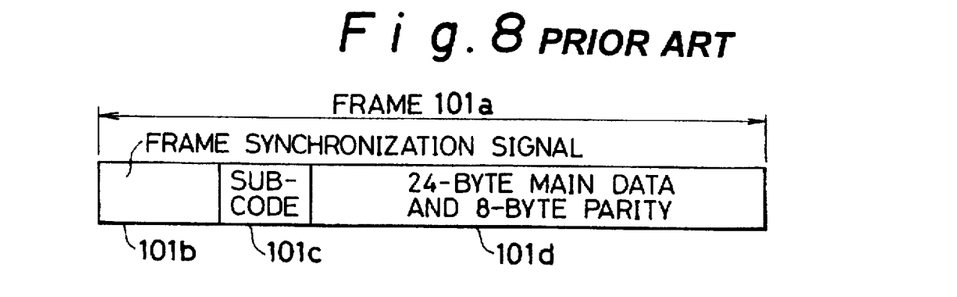
FIG. 8 is a schematic drawing showing the frame signal format of a compact disk.
Figure 9:
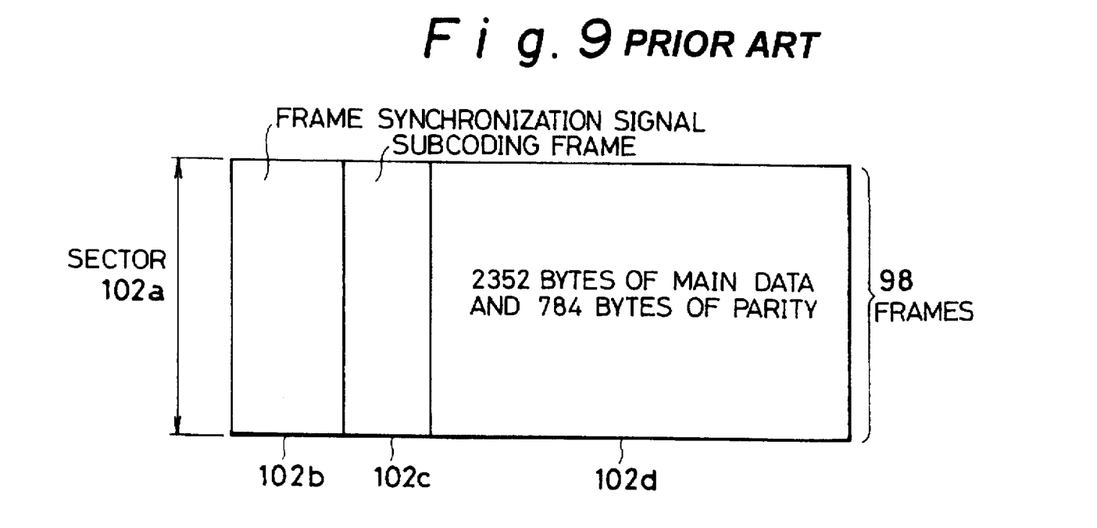
FIG. 9 is a schematic drawing showing the sector format of a compact disk.

FIGS. 8 and 9 are schematic drawings for explanation of a format used on CDs. As shown in FIG. 8, one frame (101a) of a recorded signal consists of a frame synchronization signal (101b) designating the start of the frame, a subcode (101c) designating information added to main information, and a data field (101d) in which a parity code for the detection and correction of errors is added to the 24-bytes of data corresponding to the main information. The data field (101d) is for error detection and correction combining interleaves called Cross Interleave Reed Solomon Code (CIRC). FIG. 9 shows 98 subcodes (101c) from 98 frames form one subcoding frame (102c) (hereafter also referred to as a "sector"). The sector indicates the track number (in the case where the main information is music, this is called a music number) and the absolute address information on the disk. Since the length of the sector is (1/75) seconds, 75 sectors equal one second. Sector numbers form ongoing time information and positional information which increase sequentially from the internal circumference of a disk as address information (the frame is in a base 75 format) of minute:second:frame.

Figure 7:
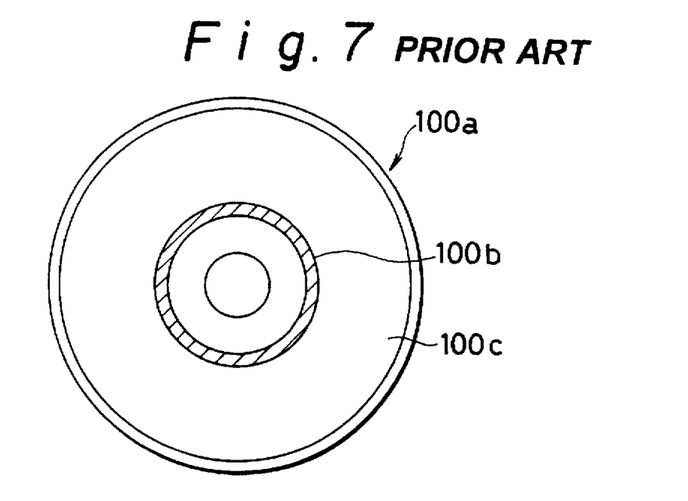
FIG. 7 is a schematic plan view of a compact disk.

FIG. 7 is a schematic drawing showing the organization of the areas on a CD. A disk (100a) consists of a main information recording area (100c) containing the main information, such as music information, and sectors numbers (absolute addresses) using subcodes, and a table of contents (TOC) area (100b) in which additional information related to each item of recorded main information (100c) is recorded. For example, the TOC area may include track numbers and sector numbers for the start of track recording and information to distinguish whether the track contains audio information or computer data, and information to prohibit or permit digital copying. When a disk is loaded, the amount of main information (e.g., the number of musical pieces), the sector number of the position at which to start recording, and the type of information (audio or data) are recognized by reading the subcode information in the TOC area (100b). The reproduction of a desired track is performed by collating the information in the TOC area (100b) and the sector number using the subcode in the main information recording area (100c).

Since the data on such CDS is recorded at a Constant Linear Velocity (CLV), the recording density is constant at any position on the disk which improves recording capacity. In the CD player, CLV control is executed by controlling the disk rotation so that the intervals of the CD reproduction signals are recorded at a CLV in the above signal format with the frame synchronization signals designating the reference length.

When various items of information are recorded on an erasable disk, such as a magneto-optical disk, it is desired that the manner in which information is reproduced from such recordable/erasable disks be compatible with conventional CDs reproduction formats and procedures. Such new disks on which information has not yet been recorded do not have absolute address information using subcodes in the CD signal format and frame synchronization signals used in CLV control. Therefore, it becomes impossible to perform an access operation at an arbitrary sector position prior to recording and CLV control (the latter being needed during recording). Therefore, it has been proposed that a guide groove of an optical disk be biased to the inner or outer side in the direction of the radius of the disk based on the state of each bit, (either 1 or 0). After the Biphase mark, modulation of the absolute address or guide groove width is changed to provide an absolute address recording system equivalent to the absolute address information using the above subcodes. See for example Japanese Patent Application Laying Open No. 64-39632.

In this case, if the frequency band for the absolute address created by Biphase mark modulation and the frequency band for recording information by Eight to Fourteen Modulation (EFM) differ from each other, both can be reproduced separately from each other and an access operation can be performed, even for an area where there is no recording information, by using the absolute address relative to a guide groove. Moreover, accurate CLV control can be obtained using the reproduction carrier component of the absolute address. This CLV control can also be performed similarly during recording.

A CD recording device enables digital audio information, from an ordinary CD player for example, to be copied directly in digital form without any deterioration in the quality at the user level without using either a digital/analog (D/A) or an analog/digital (A/D) converter. From a technological viewpoint, this digital copying is easy, but there is the legal problem of protecting the copyrights of music and software. Serial Copy Management System (SCMS) regulations have been established to protect copyrights by permitting only first-generation digital copying only one copy and prohibiting any second and subsequent digital copying. However, in the case where the user is the copyright owner, such a protection scheme prevents the owner from being able to edit his work. Moreover, this has the further disadvantage that users, may in the absence of digital copying options, use analog copying. But a piece of music, for example, digitally copied from a CD using analog techniques suffers reduced fidelity.

SUMMARY OF THE INVENTION

An object of the present invention is to provide an information recording and reproduction apparatus which protects copyrights by preventing the existence of identical information on a plurality of recording media when digitally copying the information from a first recording medium to a second recording medium.

Another object of the present invention is to provide an information recording and reproduction apparatus which reliably prevents illegal copying.

Still another object of the present invention is to provide an information recording and reproduction apparatus which quickly erases original copy information and protects copyrights by preventing the existence of identical information on a plurality of recording media even where the power of the apparatus is intentionally turned-off immediately after copying is completed.

The above-mentioned and other objects are attained with an information recording and reproduction apparatus using a recording medium containing information to prohibit digital copying, comprising a reproduction means for reproducing the desired information on a first recording medium, a recording means for recording the output of the reproduction means at a desired position on a second recording medium, an erasing means for erasing the information on the first recording medium corresponding to the information which is reproduced from the first recording medium and recorded on the second recording medium.

The first and second recording medium include a main information area, in which main information such as audio and/or video is recorded, and a management information area, in which management information containing information on the position for the recording of each item of main information together with information for prohibiting digital copying is recorded.

In an information recording and reproduction apparatus according to the invention, arbitrary editing is made possible while maintaining copyright protection. The desired main information reproduced from the first recording medium is digitally recorded in the desired area on the second recording medium, and the same main information from the first recording medium is erased. Arbitrary editing can be conducted in a short time without adversely affecting copyright protection because the main information is erased with respect to the management information. The first recording medium and/or the second recording medium cannot be removed from the information recording and reproduction apparatus before the start of the recording operation. This prevents copies of main information on a plurality of recording media.

The use of an information recording and reproduction apparatus according to the invention enables digital copying of the desired information from the first recording medium to the second recording medium without any deterioration in quality followed by erasing of the original information on the first recording medium. Accordingly, the existence of the identical information on a plurality of recording media is prevented, and the copyright of the recorded information is protected.

The first recording medium and/or the second recording medium cannot be removed from the information recording and reproduction apparatus until the erasing operation by using an erasing means has been completed.

As a result, the user is prevented from intentionally and illegally making digital copies. Because the original copy information can be erased in a short time, even when power to the information recording and reproduction apparatus is turned-off, (perhaps intentionally by the user), copies of identical information on a plurality of recording media are prevented. Both of these features provide safer copyright protection. Using the information recording and reproduction apparatus of the present invention, copying of recorded items using digital techniques conducted according to the SCMS may be conducted many times without any deterioration in quality as would otherwise be experienced with analog copying.

Further objects and advantages of the present invention will be apparent from the following description of the preferred embodiments of the invention as illustrated in the accompanying drawings.

BRIEF DESCRIPTION OF THE DRAWINGS

FIGS. 1(i), 1(ii), and 1(iii) are in combination a block diagram of an information recording and reproduction apparatus;

DESCRIPTION OF THE PREFERRED EMBODIMENTS

One embodiment in the case where the present invention is applied to a disk recording and reproduction apparatus using an erasable disk will be described as follows in reference to FIGS. 1 to 6.

Figure 2:
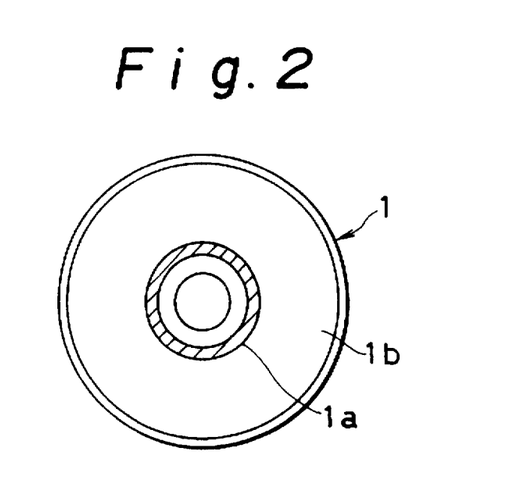
FIG. 2 is a schematic plan view of a magneto-optical disk.
Figure 3:
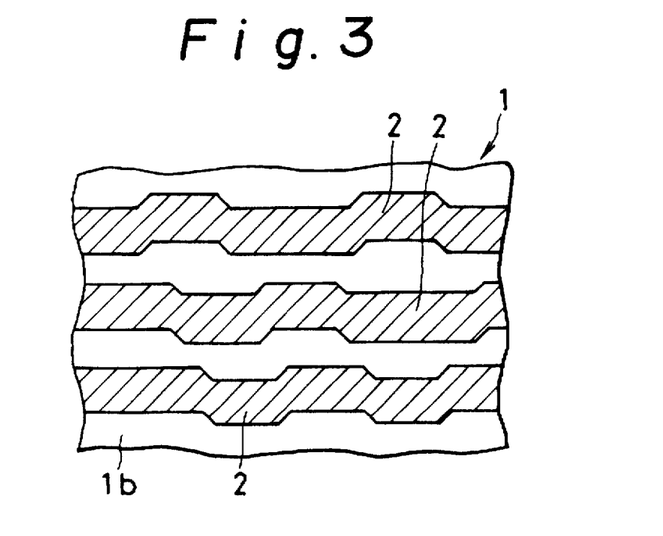
FIG. 3 is an enlarged plan view of a magneto-optical disk.

As is shown in FIG. 2, an erasable magneto-optical disk (1) has a TOC area (1a) that includes management information at the edge of an internal circumference of the disk. Most of the area outside the TOC area (1a) is a main information area (1b). Music information for example, is recorded in the main information area (1b). Additional information related to each item of main information including a music number, an absolute start address position, an absolute and address position, etc., are recorded in the TOC area (1a). Moreover, as shown in FIG. 3, spiral guide grooves (2, 2 . . . ) (indicated by hatching) are formed at predetermined intervals along the direction of the radius of the disk in the TOC area (1a) and the main information area (1b) of magneto-optical disk (1). Guide grooves (2, 2 . . . ) are biased to the inner or outer side along the direction of the radius of the magneto-optical disk (1) according to the status of the absolute address (either a 1 or 0) after the Biphase mark modulation of the absolute address on the disk. Moreover, the absolute address indicates the position on the disk and becomes an item of pre-recorded information as CLV rotation control information. The absolute address here corresponds to one sector in the CD format, and therefore, is also called a sector below.

Figures 1, 1A:
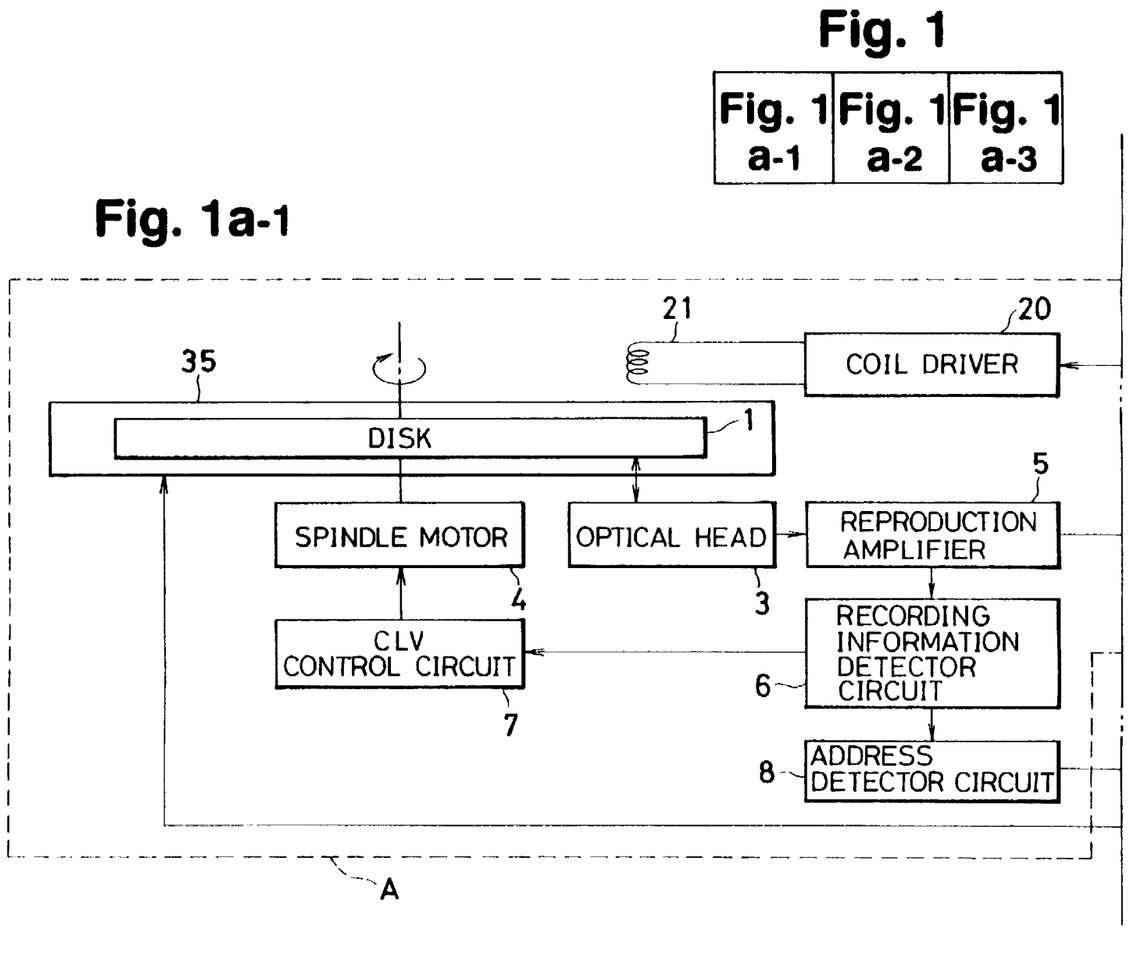
FIG. 1 shows the relationship of FIGS. 1(i), 1(ii) and 1(iii)
Figure 1A:
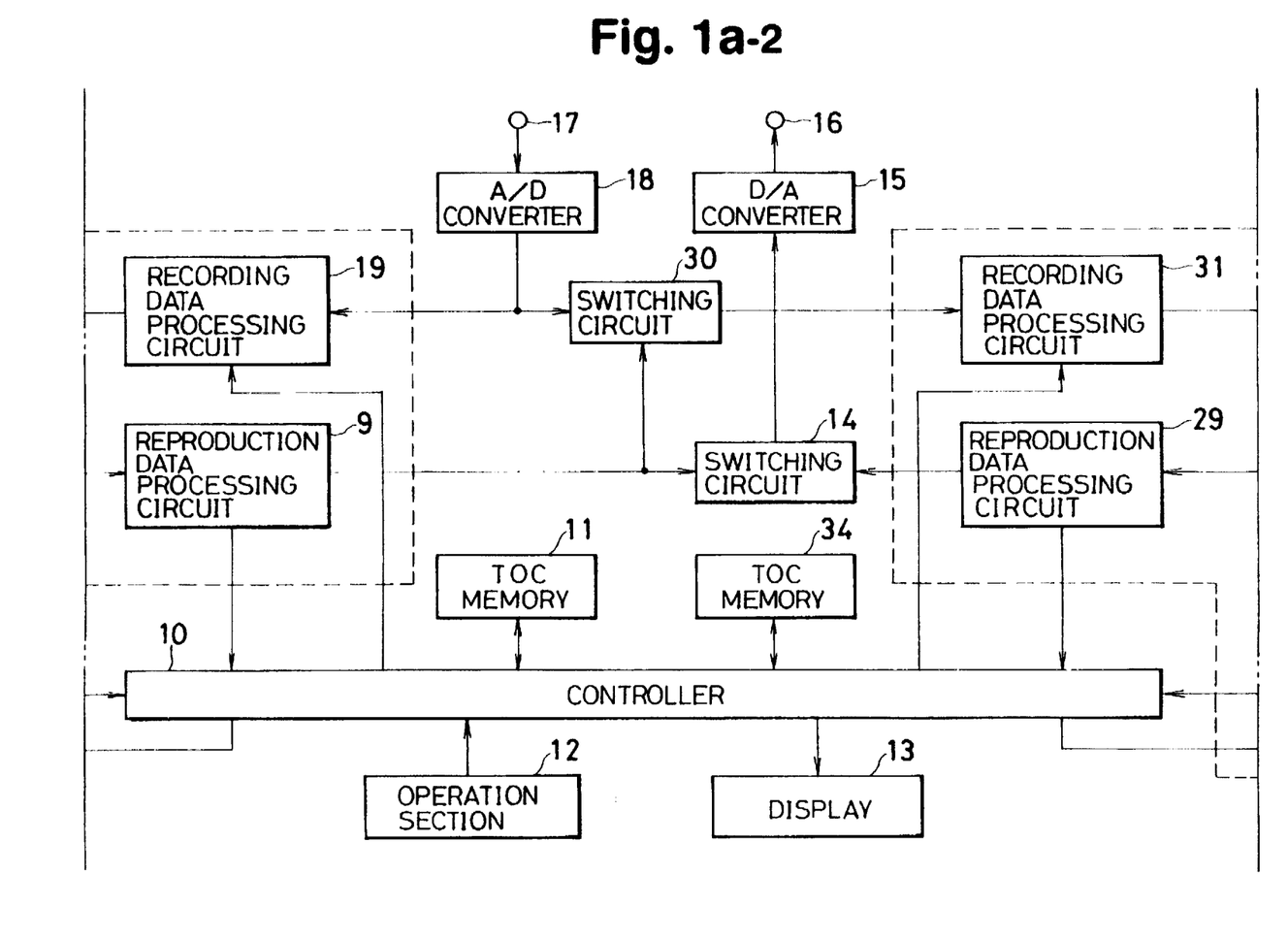
Figure 1A:
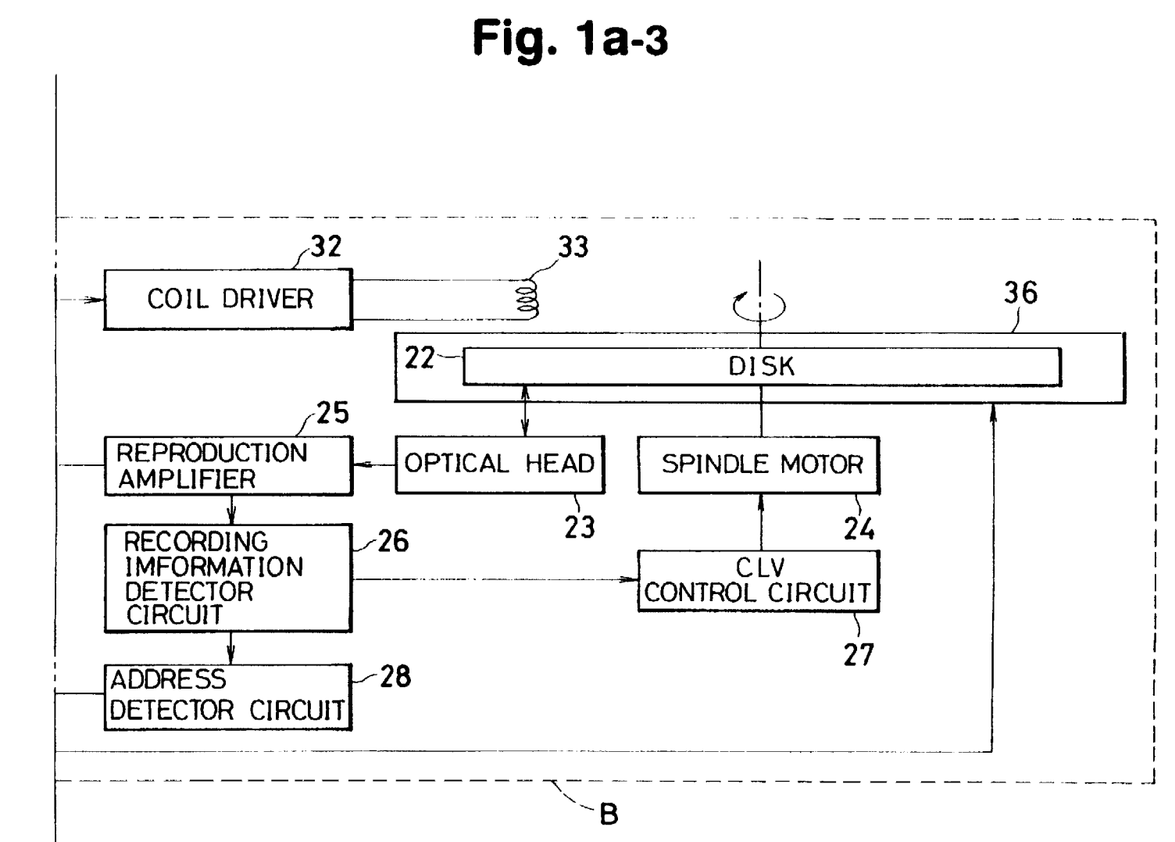

FIG. 1 is a block diagram showing the embodiment applied to a disk recording and reproduction apparatus. The disk recording and reproduction apparatus includes a unit (A) and a unit (B). Each unit can input or output audio information configured so that the audio information reproduced by the one unit can be recorded by the other unit in a digital format, i.e., the two units are controlled by a single controller (10). Since each unit has the same components, identical components are given the identical name for the sake of convenience but distinguishing numbers.

The disk recording and reproduction apparatus of this embodiment has spindle motors (4) and (24) which support and rotate magneto-optical disks (1) and (22) loaded by loading mechanisms (35) and (36) and optical heads (3) and (23) which radiate a laser beam to magneto-optical disks (1) and (22) to read the recorded information at the time of reproduction. The signal reproduced by the optical heads (3) and (23) is amplified by reproduction amplifiers (5) and (25), and magneto-optical signals in binary form are supplied to reproduction data processing circuits (9) and (29) while pre-recorded information is sent to recording information detector circuits (6) and (26). The recording information detector circuits (6) and (26) comprise a band-pass filter and a phase lock loop (PLL) and are arranged in such a way that the clock signal synchronized by the PLL is generated for the pre-recorded information in the reproduction signals extracted by the band-pass filter.

A clock signal synchronized with the pre-recorded information formed by the Biphase mark modulation of the absolute address information is supplied to CLV control circuits (7) and (27). The CLV control circuits (7) and (27) compare the synchronized clock from the recorded information detector circuits (6) and (26) and a reference frequency to detect a difference. The spindle motors (4) and (24) are driven using the difference for accurate CLV control. Moreover, the pre-recorded information extracted by the recording information detector circuits (6) and (26) is supplied to address detector circuits (8) and (28). The address detector circuits (8) and (28) comprise a Biphase mark demodulator circuit and an address decoder. After the Biphase mark demodulation of the pre-recorded information is extracted by the recording information detector circuits (6) and (26), it is decoded by the address decoder into information on positions on the disk, (i.e., the absolute address value or sector), and then supplied to the controller (10).

The reproduction data processing circuits (9) and (29) separate frame synchronization signals from the binary magneto-optical signals in the reproduction signals which are supplied by the reproduction amplifiers (5) and (25), perform EFM demodulation, separate subcode information, and sent that information to the controller (10). The reproduction data processing circuits (9) and (29) also conduct an error checking and correction operation by CIRC using the parity of the reproduction data. The reproduction data corrected by the reproduction data processing circuits (9) and (29) is sent to the digital/analog (D/A) converter (15) and converted to analog audio signals by the D/A converter (15) through a switching circuit (14), and then output to a terminal (16). The reproduction audio data which is output from the reproduction data processing circuit (9) is also supplied to a switching circuit (30).

Analog audio information which is input by a terminal (17) is converted to digital audio information by an analog/digital (A/D) converter (18) and then supplied to a recording data processing circuit (19) and the switching circuit (30). The recording data processing circuits (19) and (31) generate and add a parity for the detection and correction of an error to the digital audio information from the A/D converter (18) (in the case of the recording data processing circuit (31), this will be the digital audio information either from the A/D converter (18) or the reproduction data processing circuit (9) supplied through the switching circuit (30), add subcode information sent by the controller (10), and, after EFM modulation, add a frame synchronization signal, and supply these to coil drivers (20) and (32). The coil drivers (20) and (32) drive coils (21) and (33) according to the supplied signals and at the same time the optical heads (3) and (23) radiate a laser beam for recording onto the magneto-optical disks (1) and (22) to record signals. This signal format is the same as that of the CD used in FIGS. 8 and 9 mentioned above, and therefore, description of the signal format is omitted here.

The controller (1) receives user instructions for recording and reproducing on units (A) and (B) through an operation section (12). The controller (1) also receives absolute address information (that is, the sector value) from the address detector circuits (8) and (28) and determines the positions of the optical heads (3) and (23) in the disk area and orchestrates moving the optical head to the desired position using an optical head moving mechanism (not shown). Moreover, the controller (10) determines the subcode information provided by the reproduction data processing circuits (9) and (29) and, in the case where the detected subcodes are the contents in the TOC area, the subcode information is stored in TOC memory (11) and (34) as management information. The controller (10) reads the management information from the TOC memory (11) and (34) as the need arises.

In the case where new main information is recorded, the management information in the TOC memory (11) and (34) is updated. In recording the management information, the contents in the TOC memory (11) and (34) are read and supplied to the recording data processing circuits (19) and (31) as the management information to conduct the recording in the above-mentioned recording procedure. In addition to the operational status of each unit, the recording or reproduction positions of the optical heads (3) and (23) indicated by the absolute address information are displayed sequentially on a display (13). Furthermore, the controller (10) generates an instruction to prevent or permit the removal of the magneto-optical disks (1) and (22) from the loading mechanisms (35) and (36).

Figure 4:
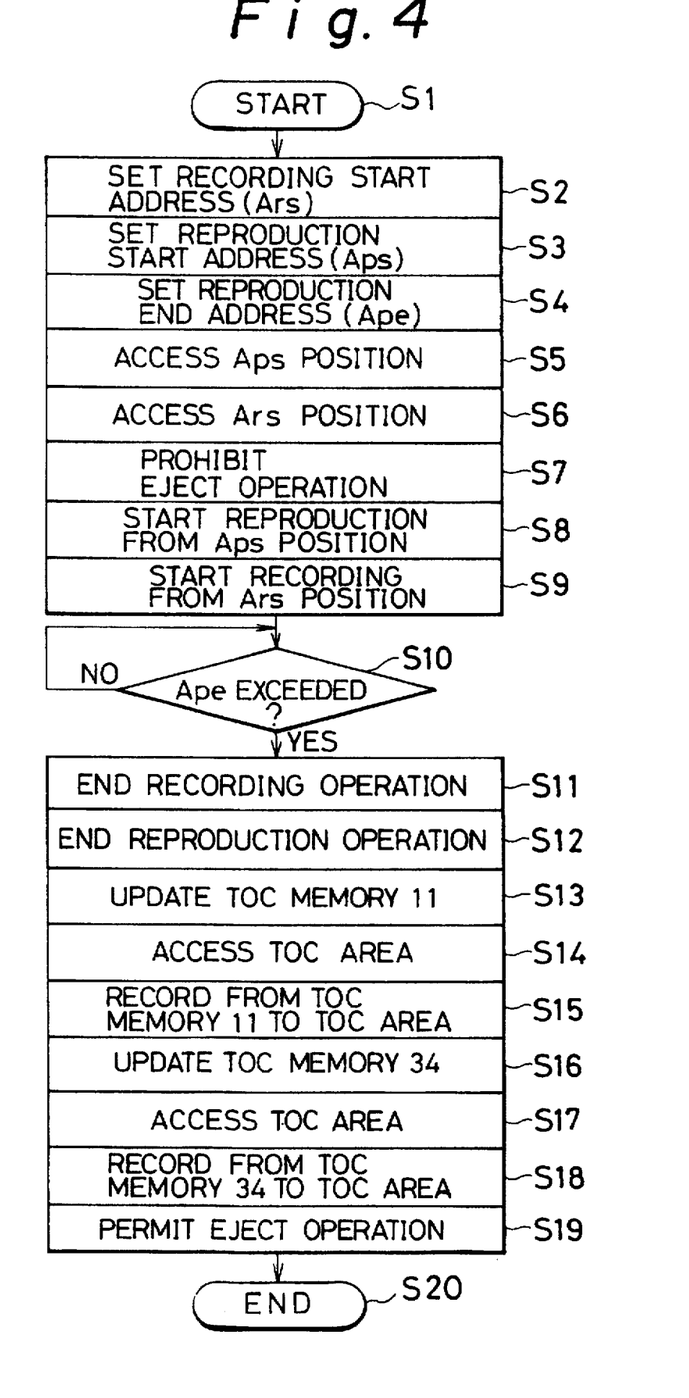
FIG. 4 is a flowchart showing the flow of control in the digital copying operation of an information recording and reproduction apparatus.

FIG. 4 is a flowchart of processing control of the controller (10) when digital copying from one unit (A) to another unit (B) is conducted. Copying of the music information shown in FIGS. 5a to 5d is used as an example application. FIGS. 5a to 5d are examples of the arrangements of music information on the magneto-optical disks (1) and (22), before and after digital copying is conducted. The hatching in a drawing indicates the absence of significant music information.

Figure 5A:
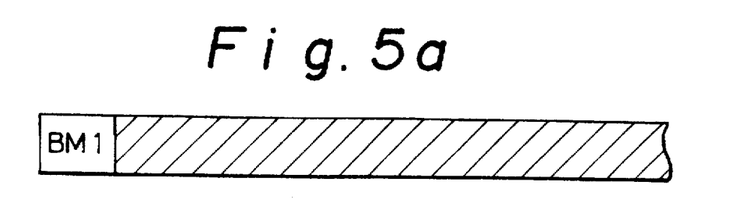
FIGS. 5a to 5d are schematic drawings showing the arrangements of music information on a disk, before and after digital copying is conducted.

FIG. 5a shows the arrangement of music information on the magneto-optical disk (22) loaded in the loading mechanism (36) of the unit (B) before digital copying is conducted. Only the first music number (BM1) is designated. Therefore, the contents of Table 1 are read from the magneto-optical disk (22) in advance and stored as management information in the TOC memory (34) corresponding to the other unit (B).

TABLE 1

| Music Number | Start address | End address |
|---|---|---|
| 1 | 00 min 02 s, 00 frames | 05 min 34 s, 74 frames |

Figure 5B:
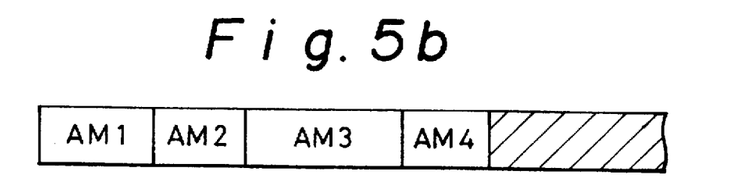

FIG. 5b shows the arrangement of music information on the magneto-optical disk (1) loaded in the loading mechanism (35) of the unit (A) before digital copying is conducted. Music numbers one through four (AM1)–(AM4) are arranged, and the contents of Table 2 are read from the magneto-optical disk (1) in advance and stored as management information in the TOC memory (11) corresponding to the unit (A).

TABLE 2

| Music number | Start address | End Address |
|---|---|---|
| 1 | 00 min 02 s, 00 frames | 08 min 13 s, 74 frames |
| 2 | 08 min 14 s, 00 frames | 15 min 09 s, 74 frames |

TABLE 2-continued

| Music number | Start address | End Address |
| --- | --- | --- |
| 3 | 15 min 10 s, 00 frames | 26 min 26 s, 74 frames |
| 4 | 26 min 27 s, 00 frames | 32 min 57 s, 74 frames |

Figure 5C:
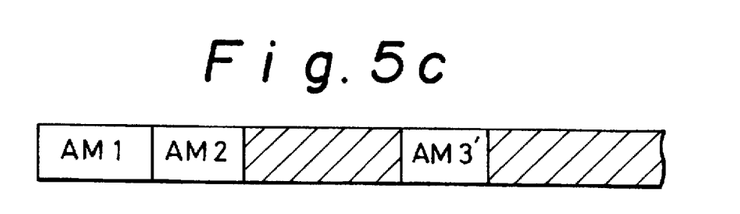

FIG. 5c shows the arrangement of music information on the magneto-optical disk (1) of the unit (A) after digital copying (that is, after execution of the digital copying operations shown in FIG. 4). The third music number (AM3) in FIG. 5b has been erased and the fourth music number (AM4) has been renumbered as the third music number (AM').

Figure 5D:
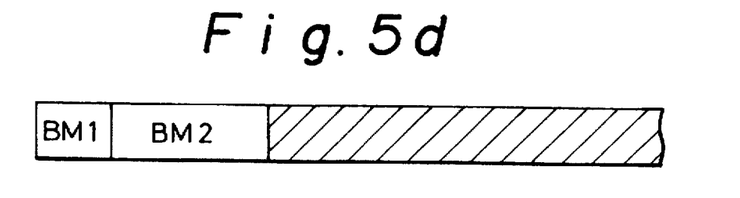

FIG. 5d shows the arrangement of music information on the magneto-optical disk (22) of the unit (B) after digital copying (that is, after execution of the digital copying operations shown in FIG. 4). The second music number (BM2) has been added to disk (22). The music selection identified by the third music number (AM3) on the magneto-optical disk (11) is digitally copied as music number (BM2) from the start of the blank area on the magneto-optical disk (22).

This example of executing digital copying from the music information arrangement in FIGS. 5a and 5b to the music information arrangement in FIGS. 5c and 5d will now be explained with reference to FIG. 4. For the data to be recorded by the unit (B), digital copying is conducted with the output of the reproduction data processing circuit (9), which is the reproduction output of the unit (A) connected as an input of the recording data processing circuit (31) through the switching circuit (30).

The controller (10) sets the recording start address (hereafter referred to as Ars) in the unit (B) in (S2), the reproduction start address (hereafter referred to as Aps) in the unit (A) in (S3), and the reproduction end address (hereafter referred to as Ape) in the unit (A) in (S4) when it is given an instruction for digital copying. The instruction specifies copying of the third music number (AM3) on the magneto-optical disk (1) into the blank area on the magneto-optical disk (22) based on input to the controller (10) by the operation section (12). To correspond to Tables 1 and 2, (Ars) becomes the head address in the blank area on the magneto-optical disk (22). The next value [05 min 35 s, 00 frames] of the end address of the first number is given by Table 1, which is the contents of the TOC memory (34). (Aps) is to reproduce the third number on the magneto-optical disk (1), [15 min 10 s, 00 frames], which is the start address of the third number given by Table 2, which is the contents of the TOC memory (11) and [26 min 26 s, 74 frames] given as (Ape).

Next, after the access operation to the (Aps) position of the optical head (3) in (S5), the access operation to the (Ars) position of the optical head (23) is conducted in (S6), and an instruction to prohibit ejection of the magneto-optical disks (1) and (22) is given to the loading mechanisms (35) and (36) in (S7). In (S8), reproduction starts from the (Aps) position on the magneto-optical disk (1). The reproduction of the third music number (AM3 starts, and in (S9), recording onto the magneto-optical disk (22) starts from the (Ars) position. The contents of the third number (AM3) on the magneto-optical disk (1) are reproduced and digitally recorded as the second number (BM2) on the magneto-optical disk (22). Then, in (S10), it is determined whether the reproduction operation for the third music number (AM3) on the magneto-optical disk (1) ends by the absolute address information on the magneto-optical disk (1) obtained form the address detector circuit (8). If the address exceeds (Ape), control goes to (S11) at the point in time that the desired reproduction ends. In (S12), the recording operation in the unit (B) is terminated, and the recording end address (hereafter referred to as Are) on the magneto-optical disk (22) at that time is obtained from the address detector circuit (28).

Next, in (S13), the management information in the TOC memory (11) is updated. The contents of Table 2 are updated to the contents shown in Table 3 by erasing the third number (AM3) as shown in FIG. 5c for the digital copying operation by reproducing the third number (AM3) shown in FIG. 5b.

TABLE 3

| Music number | Start address | End Address |
| --- | --- | --- |
| 1 | 00 min 02 s, 00 frames | 08 min 13 s, 74 frames |
| 2 | 08 min 14 s, 00 frames | 15 min 09 s, 74 frames |
| 3 | 26 min 27 s, 00 frames | 32 min 57 s, 74 frames |

As shown in Table 3, the management information related to the third number (AM3) reproduced for the digital copying operation is erased, and the contents registered as the fourth number (AM4) is renumbered as the third number (AM3'). After the optical head (3) is accessed at the TOC area on the magneto-optical disk (1) in (S14), the contents in the TOC memory (11) shown in Table 3 are recorded in (S15), thereby updating the management information in the TOC area on the magneto-optical disk (1). The contents in Table 1 are updated to the contents shown in Table 4 of the recording of a new second number BM2), such as shown in FIG. 5d.

TABLE 4

| Music number | Start address | End Address |
| --- | --- | --- |
| 1 | 00 min 02 s, 00 frames | 05 min 34 s, 74 frames |
| 2 | 05 min 35 s, 00 frames | 16 min 51 s, 74 frames |

As shown in Table 4, (Ars) is given and added as the start address of a new second number and (Are) is given and added as the end address.

In (S17), the optical head (23) is accessed at the TOC area on the magneto-optical disk (22) and then, in (S18), the contents in the TOC memory (34) shown in Table 4 are recorded, thereby updating the management information the TOC area on the magneto-optical disk (22). Then, in (S19), an instruction permitting removal of the magneto-optical disks (1) and (22) is given to the loading mechanisms (35) and (36) to enable the subsequent eject operation. In (S20), the series of operations is terminated.

In this way, digital copying is conducted by controlling a plurality of units uniformly. During this digital copying operation, the original copy information is erased so that plural recording media cannot store copies of the same information. Users cannot intentionally prevent the erasing of the original copy information by removing the disk before the erasing is completed because removal of the magneto-optical disk loaded in the recording and reproduction apparatus is prohibited during the digital copying operation up through the time the original copy information is erased. Therefore, such illegal digital copying is prevented.

If power to the disk recording and reproduction apparatus at the end of digital copying is removed, the present invention prevents more than one disk from storing the recorded information. The existence of the main information is recognized only by the management information in the TOC area on each magneto-optical disk, in (S13) and (S15). The original management information is erased after the execution of the digital copying of audio information, and then in (S16) and (S18), the management information is registered at the copy destination. Assuming the power is turned off in the middle of a step, if processing is in the sequence preceding (S14), digital copying is not performed. If processing is between (S15) and (S17), the original information is erased from the magneto-optical disk (1). In either case, the existence of identical contents on a plurality of recording media is prevented.

Figure 6:
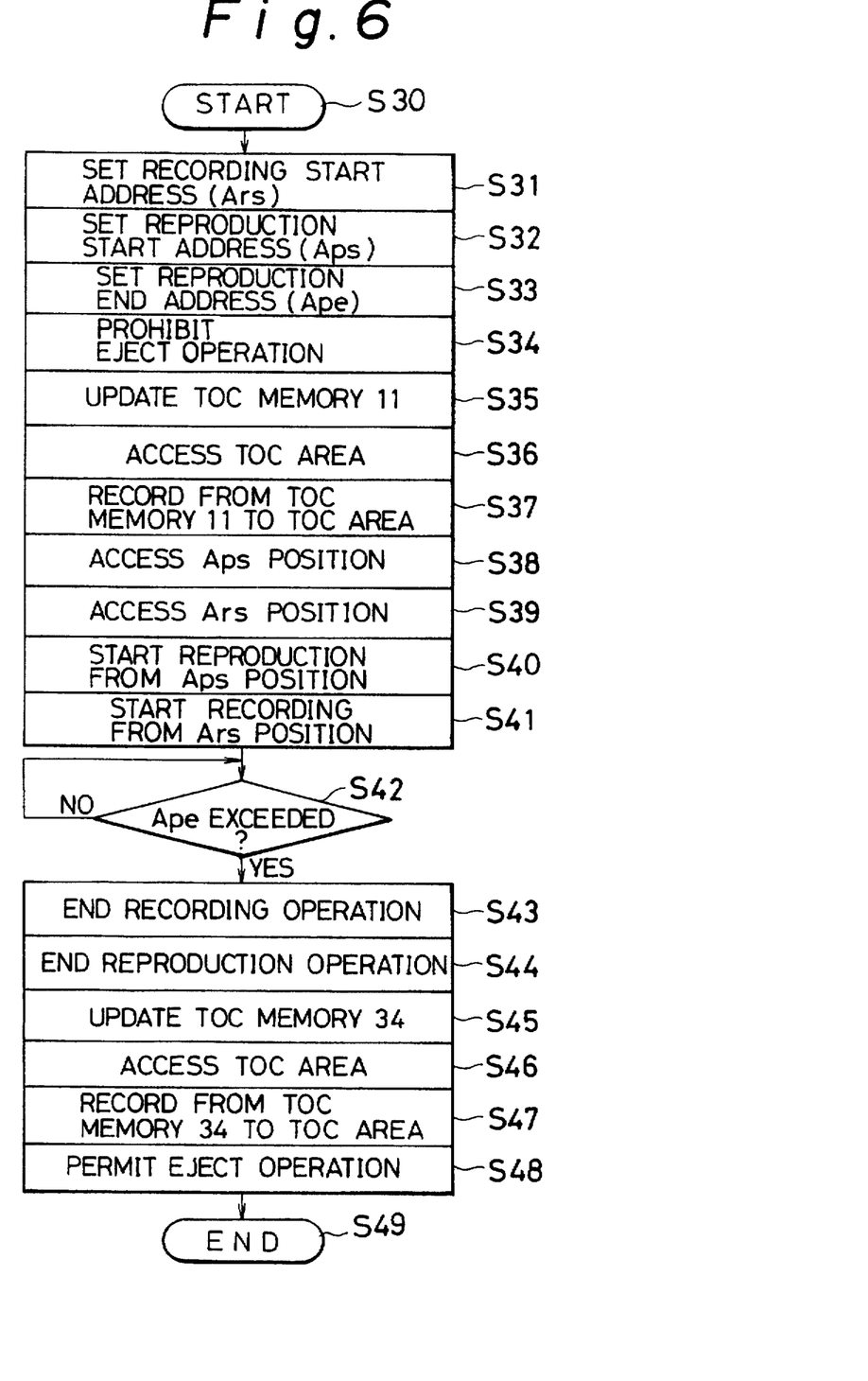
FIG. 6 is another example of a flowchart showing the flow of control in the digital copying operation of an information recording and reproduction apparatus.

As shown in another embodiment in FIG. 6, an effect similar to the above can be obtained by first erasing the original digital copying management information in (S35) to (S37), and then performing digital copying in (S38) to (S44) to update the management information at the copy destination (S45) to (S47). Thus, it is apparent that the invention can be implemented in a variety of forms.

An example has been described of an information recording and reproduction apparatus using a recording medium having a TOC area in which management information is recorded. In a system using a recording medium not having a TOC area, similar digital copying can be made by erasing the original information (for example, the information is overlapped for recording in silent form) even though it takes time.

In the example embodiments, an erasable disk apparatus for audio information based on the CD format has been described, but the invention is not limited to this. It goes without saying that the invention can also be applied to other formats including both disk and tape formats. The invention can be implemented in an apparatus which handles video information and data for computers. Many widely differing embodiments of the present invention may thus be constructed without departing from the spirit and scope of the present invention. It should be understood that the present invention is not limited to the specific embodiments described in the specification, except as defined in the appended claims.

What is claimed is:

1. An information recording and reproduction apparatus using a recording medium containing information to prohibit digital copying, comprising:

a reproduction means for reproducing desired information on a first recording medium;

a recording means for recording said desired information reproduced by said reproduction means at a desired position on a second recording medium; and an erasing means for erasing only said desired information on said first recording medium after the reproduction of said desired information on said first recording medium and the recording of said desired information on said second recording medium are completed, so as to prevent existence of said desired information on both of said first recording medium and said second recording medium.

2. An information recording and reproduction apparatus according to claim 1, wherein said first and second recording medium consist of a main information area including audio and/or video data, and a management information area including information on the position for the recording of each item of main information and information for prohibiting digital copying.

3. An information recording and reproduction apparatus according to claim 1, further comprising a means for prohibiting the discharge of said first recording medium and/or second recording medium from the information recording and reproduction apparatus until the erasing operation by said erasing means has been completed.

4. An information recording and reproduction apparatus according to claim 2, wherein said first and second recording medium are optical disks.

5. An information recording and reproduction apparatus according to claim 2, wherein said erasing means erases the main information on said first recording medium corresponding to the information recorded on said second recording medium from said first recording medium.

6. An information recording and reproduction apparatus according to claim 2, wherein said erasing means erases the management information on said first recording medium corresponding to the information recorded on said second recording medium from said first recording medium.

7. An information recording and reproduction apparatus according to claim 2, wherein said erasing means comprises an updating means for updating the management information recorded on said first and second recording medium according to the information recorded on said second recording medium from said first recording medium.

8. An information recording and reproduction apparatus according to claim 7, wherein said erasing means further comprises a first management information memory for storing the management information on said first recording medium and a second management information memory for storing the management information on said second recording medium, and said updating means updates the contents in each management information memory according to the information recorded on said second recording medium from said first recording medium and then updates the management information on said first and second recording medium.

9. An information recording and reproduction apparatus according to claim 7, wherein said updating means updates the management information on said first and second recording medium after recording of the information on said second recording medium from said first recording medium.

10. An information recording and reproduction apparatus according to claim 7, wherein said updating means updates the management information on said first recording medium before recording on said second recording medium from said first recording medium and updates the management information on said second recording medium after the recording of said information.

11. A method for recording and reproducing information using an information recording and reproducing apparatus, comprising the steps of:

reproducing desired information recorded on a first recording medium;

recording the reproduced desired information at a desired position on a second recording medium; and erasing only the desired information on the first recording medium after the reproducing step of the desired information on said first recording medium and the recording step of the desired information on said second recording medium are completed, so as to prevent existence of the desired information on both of said first recording medium and said second recording medium.

12. The method according to claim 11, wherein the first and second recording medium have a main information area where audio and/or image information is recorded, and a management information area where a recording position for each item of main information and information for prohibiting digital copying are recorded.

13. The method according to claim 11, further comprising:

prohibiting removal of the first recording medium or second recording medium from the information recording and reproduction apparatus until the erasing step is completed.

14. The method according to claim 12, wherein the erasing step includes:

erasing the main information on the first recording medium that is recorded on the second recording medium.

15. The method according to claim 12, wherein the erasing step includes:

erasing the management information on the first recording medium that is recorded on the second recording medium.

16. The method according to claim 12, further comprising:

updating the management information recorded on the first and second recording mediums to reflect the information recorded on the second recording medium from the first recording medium.

* * * * *